(12) United States Patent
Gupta

(10) Patent No.: US 6,443,178 B1
(45) Date of Patent: Sep. 3, 2002

(54) MOLDING SERVICE STATION FOR PROVIDING ACCESSORIES IN CASTING PRODUCTION

(76) Inventor: Lakshimi P. Gupta, 234 Lott Rd., Pittsburgh, PA (US) 15235

( * ) Notice: Subject to any disclaimer, the term of this patent is extended or adjusted under 35 U.S.C. 154(b) by 53 days.

(21) Appl. No.: 09/597,216

(22) Filed: Jun. 20, 2000

(51) Int. Cl.[7] .............................................. B65H 17/34
(52) U.S. Cl. ............. 137/355.17; 137/560; 137/565.12; 137/899
(58) Field of Search ..................... 137/355.17, 355.16, 137/360, 560, 565.12, 899

(56) References Cited

U.S. PATENT DOCUMENTS

| 2,345,223 | A | * | 3/1944 | Upp ............................ 137/343 |
| 3,662,777 | A | | 5/1972 | Plunkett |
| 3,930,790 | A | * | 1/1976 | Rogosch ...................... 432/229 |
| 4,170,307 | A | | 10/1979 | Maeder |
| 5,038,819 | A | | 8/1991 | Sutphen |
| 5,137,235 | A | * | 8/1992 | Wentworth et al. ....... 248/124.1 |
| 5,171,613 | A | * | 12/1992 | Bok et al. .................... 427/422 |
| 5,396,885 | A | * | 3/1995 | Nelson ................... 128/204.18 |

* cited by examiner

Primary Examiner—A. Michael Chambers
(74) Attorney, Agent, or Firm—H. Keith Hauger

(57) ABSTRACT

The present application is a molding service station for providing accessories utilized in the casting production which includes a sturdy weighted pedestal base, at least a first panel and second panel spaced apart for holding the various accessories and equipment. A column connects the panel to the pedestal base. The molding service station includes an electric power source, a compressed air source and natural gas source all used in the casting process. The panels are constructed in the form of a lattice allowing various hooks and other holding means to be easily attached and removed from various locations.

14 Claims, 4 Drawing Sheets

MOLDING SERVICE STATION FOR PROVIDING ACCESSORIES IN CASTING PRODUCTION

BACKGROUND OF THE INVENTION

1. Field of the Invention

This invention relates generally to a molding service station that enables a molder to safely, quickly and easily service the mold which is producing the castings.

2. Description of the Prior Art

Although permanent die cast molding constitutes a well-known art, there is a never-ending demand to develop new means of technology which if not directly involved with the molding process is ancillary thereto. The Maeder Pat., No. 4,170,307 discloses a service module having tool holding panels for electrical and compressed air supplies. The invention directs itself to service for bicycles and comprises a housing having outer plastic panels. U.S. Pat. No. 3,662,777 to Plunkett discloses a cart for transporting fluid actuated devices and having an axle rotatably supporting wheels on opposite ends thereof with the axle defining a fluid flow passage for supplying actuating fluid to the respective devices. U.S. Pat. No. 5,038,819 to Sutphen discloses a movable air stand for pneumatic tools having a supporting base and a vertical column supported by the base. Hangers are located on the column supporting one or more pneumatic tools when they are not in use.

Today and predictably into the future, the demand and concerns for efficient casting production include optimization of the process, reduction of costs in production and minimization of labor expended. It is noted in the prior art that the disclosed structures require additional labor, steps and procedures not evident in the present invention which more accurately meets the criteria of current and future times specifically enabling molded castings to be efficiently, safely and quickly produced in precise fashion.

SUMMARY OF THE INVENTION

It is, therefore, an object of the present invention to provide a molding service station that enables the molder to safely, quickly and easily service molds in the molding machine and castings which are being produced.

It is the further object of the present invention to provide a molding service station that enables the molder to access compressed air for mold cooling, use with air powered tools, machine operation, spray gun operation and gas heater operation, all integral to the process of producing quality castings.

It is another object of the present invention to provide an electrical power source which is close and convenient for miscellaneous devices and instruments used in the casting process via 110 volt outlets and for more heavy equipment, 200 volt hook-ups into disconnect boxes.

It is another object of the present invention to provide gas outlets which serve the molder for heating applications of the molds and castings.

It is the further object of the present invention to provide the molder with a molding service station that is close and convenient to the molding operation.

It is the further object of the present invention to utilize a heat shield to protect all disconnect boxes, timers and outlets from heat produced by residual gas and electric heaters which are in close proximity to the casting operation.

It is an additional object of the present invention to provide a convenient holding station for locating large and small gas heaters, large and small electric heaters, thermal blankets, containers of mold coatings and a variety of other molding and casting accessories.

It is the further object of the present invention to provide a molding service station which safely locates electrical lines and cables, compressed air lines and hoses and gas lines and hoses which lead from above the casting operation directly to the molding service station making the workplace more safe, because all equipment, lines and hoses are off the floor area where workmen would be most likely to trip and fall over same.

More specifically, the present invention is a molding service station for providing accessories utilized in casting production, comprising a pedestal base; at least a first panel and a second panel having spaced apart opposing sides; a column for supporting said panel; an electric power source; a compressed air source and a natural gas source.

These objects, as well as the other objects and advantages of the present invention, will become apparent from the following description in reference to the illustrations appended hereto.

BRIEF DESCRIPTION OF THE DRAWINGS

For a better understanding of the present invention, reference may be had to the accompanying drawings in which.

DESCRIPTION OF PREFERRED EMBODIMENTS

Figure 1:
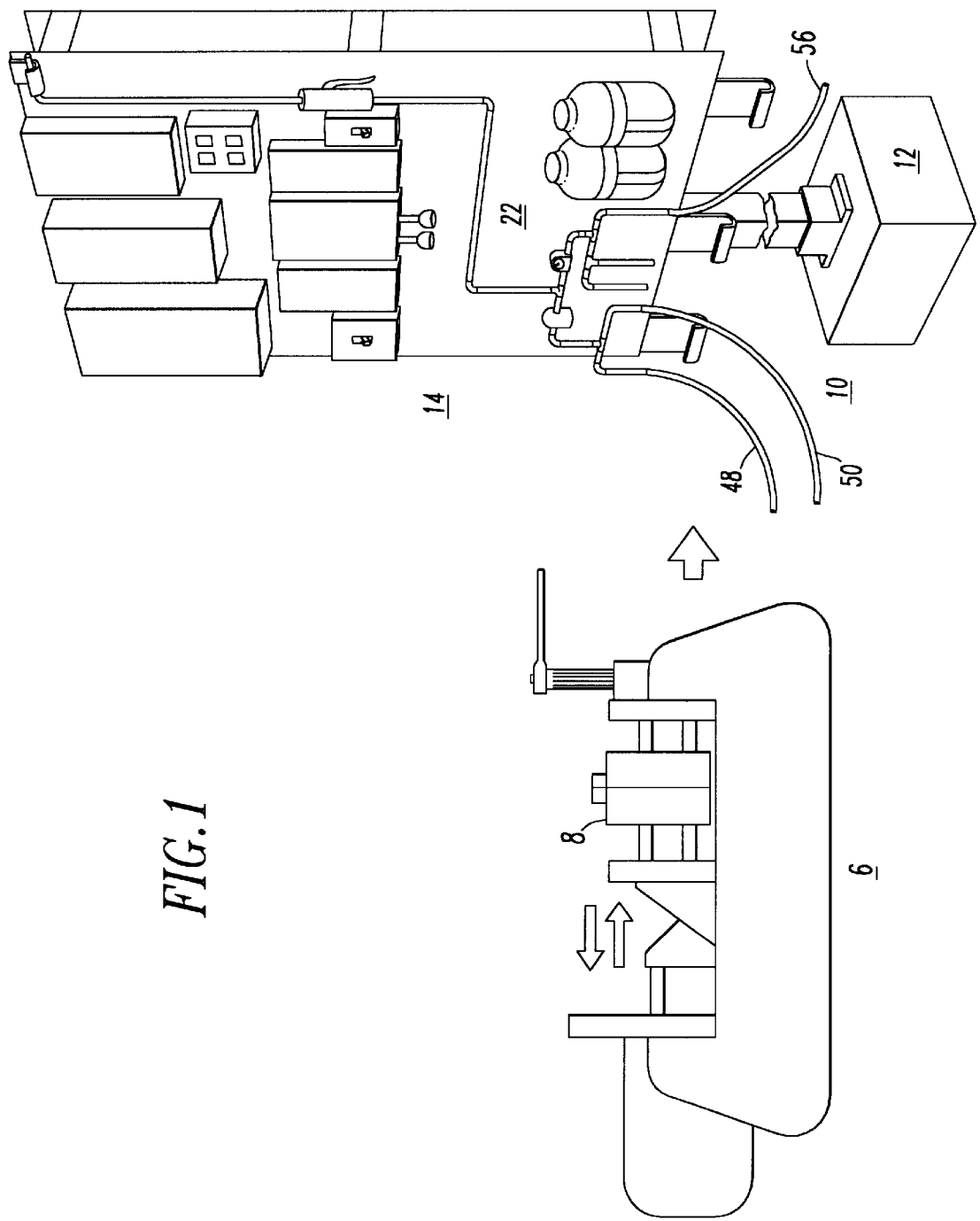
FIG. 1 is a perspective view of a molding service station located in close proximity to a molding machine providing the molder with all necessary electrical, pneumatic and other equipment and accessories.

Referring to FIG. 1, there is shown a molding service station 10 that enables a molder in almost any type of process to safely, quickly and easily service a mold 8 located in a molding machine 6 for production of a casting. Although molding service station 10 is shown in connection with a permanent mold casting method, it can be used in connection with any molding process of materials. In the permanent mold casting process, fluid metal 4 is poured by hand into mold 8, whereby mold 8 is held together under pressure.

Molding service station 10 is used for holding and organizing various accessories utilized in the production of castings. Molding service station 10 consists of a pedestal base 12, panel 14 and a column 20 connected to pedestal base 12 for holding panel 14. The preferred embodiments of pedestal base 12 is a continuous-cast iron block which prevents tipping of molding service station 10. Column 20 may be constructed of or fabricated from a variety of materials and in a variety of shapes, but the preferred embodiment of column 20 is a metal alloy designed with sufficient strength to hold panel 14 and all accessories located thereon. Molding service station 10 enables a molder to access electrical power, compressed air and natural gas which will be more specifically described herein.

Figure 2:
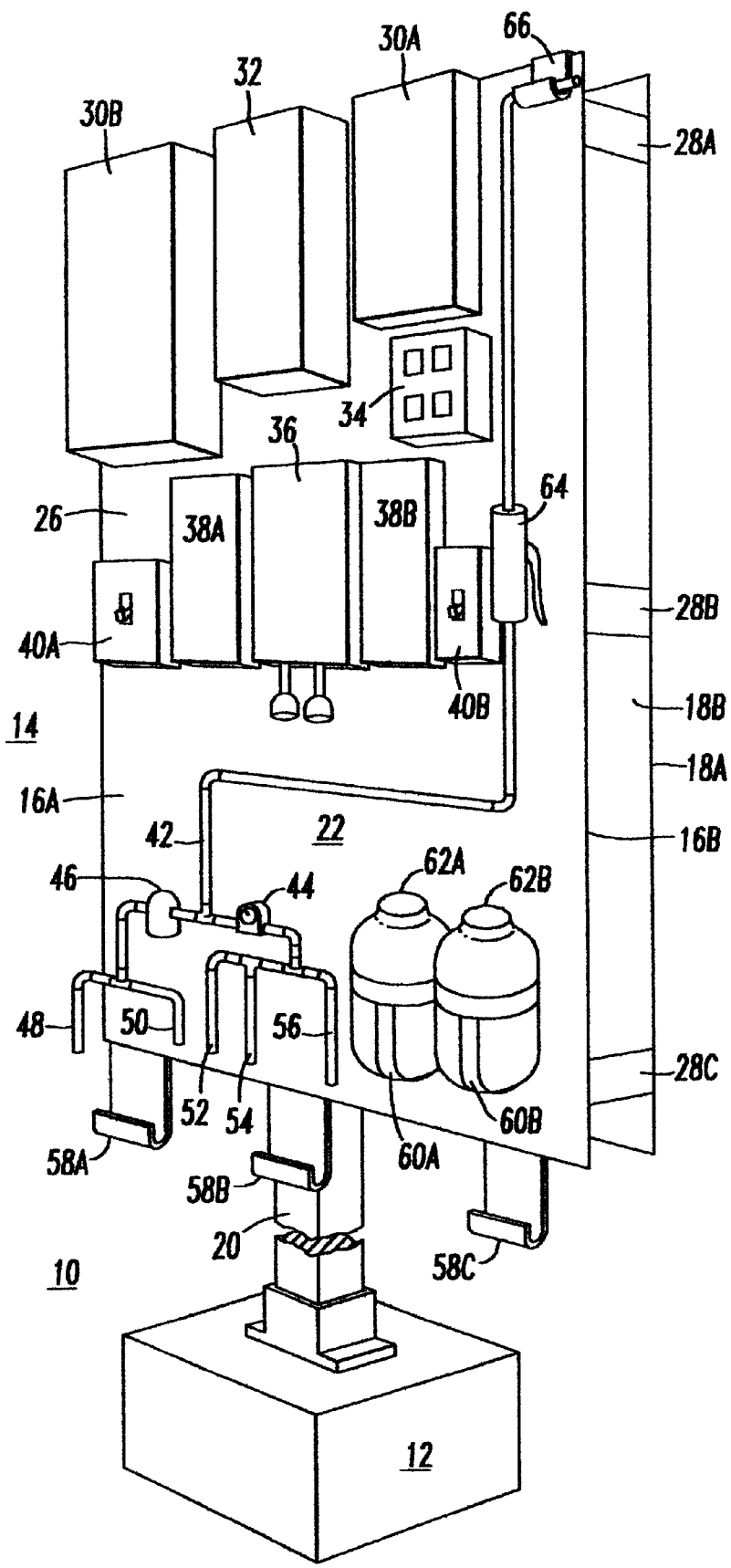
FIG. 2 is a detailed perspective view of the within invention illustrating a front view of a molding service station.

FIG. 2 specifically depicts a detailed view of the preferred embodiment of molding service station 10 showing front panel face surface 16A, front panel rear surface 16B, rear panel space surface 18A and rear panel rear surface 18B connected to connecting column 20. Front panel face surface 16A and front panel rear surface 16B are shown constructed in the form of lattice grid 22, and likewise, rear panel face surface 18A and rear panel rear surface 18B are shown constructed in lattice grid 24. Electrical control panel 26 is shown located on front panel face surface 16A and is constructed to be heat resistant to shield all accessories and equipment located on panel 14 from heat produced by residual gas and electrical heaters like electrical heater 70 shown in FIG. 3 and located on rear panel face surface 18A. Front panel rear surface 16B is separated from rear panel rear surface 18B by a plurality of bands. Upper band tab 28A, middle band tab 28B and lower band tab 28C are shown in FIG. 2 as separating front panel rear surface 16B from rear panel rear surface 18B and also serve to attach and secure front panel rear surface 16B to rear panel rear surface 18B.

Molding service station 10 as shown in FIG. 2 specifically holds electrical components including first disconnector 30A, second disconnector 30B which act as switches that isolate circuits or various electrical apparatus after an interruption of current. Other electrical components held by molding service station 10 include circuit breaker 32, electrical outlet 34, contactor 36 which serve as a heavy-duty relay for use in controlling the various electric power circuits. Molding service station 10 also holds other various electrical components including first timer 38A, second timer 38B, first electrical switch 40A, second electrical switch 40B.

Molding service station 10 serves to hold various pneumatic equipment, including compressed air supply inlet 42, pressure regulator gauge 44, moisture separator 46, outlet piping 48 leading to molding machine 6, outlet piping for mold cooling and hand tools 50, and outlet piping 52 leading to spray gun 64.

Natural gas is accessed on molding service station 10 as seen by first outlet pipe 54 providing an air source to gas heater 82, second outlet pipe 56 utilized for maintaining a specified temperature within mold 8.

Molding service station 10 has a plurality of holding means including first hose hook 58A, second hose hook 58B and third hose hook 58C utilized to hold a variety of hoses and lines to avoid laying same on the floor area where a worker would be most likely to trip and incur injury. A first mold coating container 62A and a second mold coating container 62B are shown held by first container holding means 60A and second container holding means 60B in their preferred embodiment constructed in the form of straps connecting to front panel face surface 16A, although they may be constructed of a variety of materials and in a variety of shapes. Mold coating is used as part of the casting operation whereby mold coating contained in first mold coating container 62A and second mold coating container 62B are used to coat the inside of mold 8 for most commonly ejection and surface finish reasons.

Spray gun 64 is mounted to front panel face surface 16A by spray gun holding means 66 which in its preferred embodiment is a heavy-duty hook. Spray gun 64 is kept near the mold coatings and is utilized to spray the mold coatings.

Figure 3:
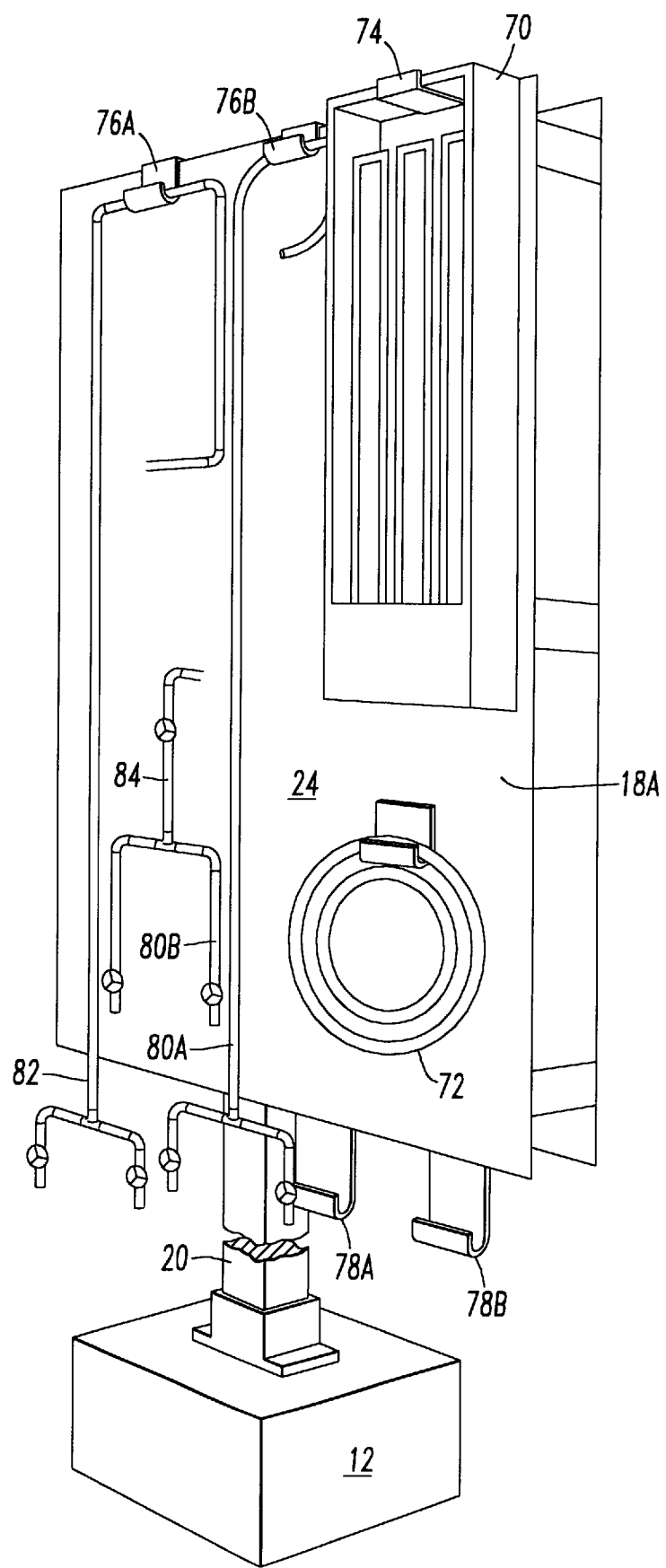
FIG. 3 is a detailed perspective view of the within invention illustrating a back view of a molding service station.

Mold 8 must be preheated before the first casting is poured. Thus, molding service station 10 as shown in FIG. 3 at rear panel face surface 18A contains electric heater 70, electric heater hose 72 whereby electric heater 70 is held by electric heater holding means 74 being preferably a heavy-duty hook, but may be constructed in a variety of shapes and from a variety of materials. Gas heater 82 is likewise located on rear panel face surface 18A having a first gas heater holding means 76A and a second gas heater holding means 76B consisting of preferably a heavy-duty hook. First electric cable holding means 78A and second electric cable holding means 78B are also in their preferred embodiment in the shape of heavy-duty hooks for holding various electric cables.

Gas heater feed line 80A and gas heater feed line 80B are located in their preferred embodiment on rear panel face surface 18A and provides a gas source to gas heater 82, as well as other gas fueled accessories. Other gas lines, including gas pipe line 84 are shown.

Figure 4:
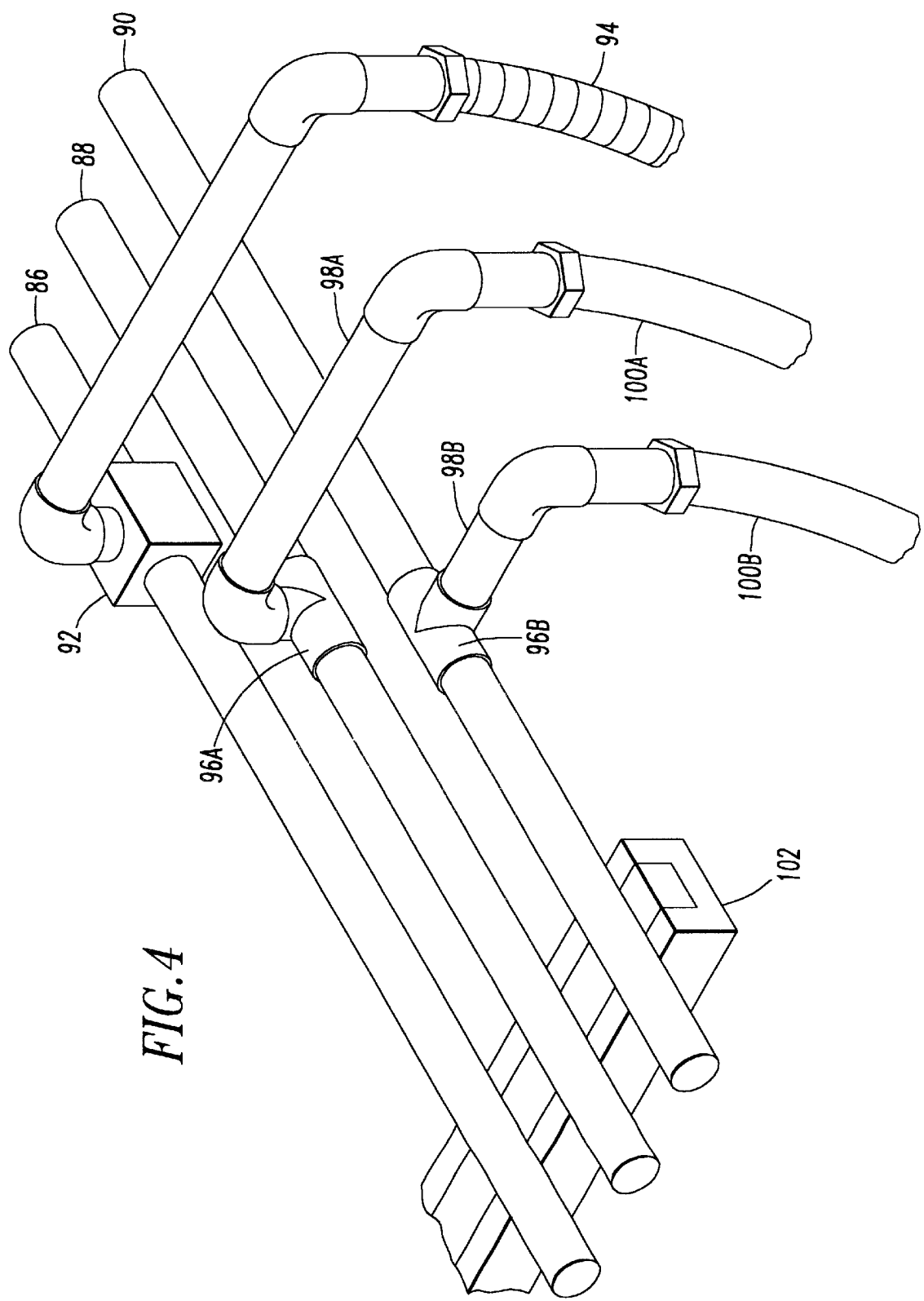
FIG. 4 is a perspective view of a crane runway indicating the electrical power source, gas power source and air power source which lead to the molding service station located below.

FIG. 4 shows electric conduit 86, outside main air pipe supply line 88 and outside main gas supply line 90 supported in the upper structure of a shop by structural support 102 and other like structural supports. Also shown in FIG. 4 are electric junction box 92, flexible electrical conduit 94 leading to molding service station 10, various other components including T-reducer 96A and T-reducer 96B. Piping for compressed air 98A and piping for gas 98B are also shown supported by structural support 102. Air hose 100A leads to molding service station 10 below, and gas hose 100B leads to various gas supply components below, all located on molding service station 10.

I claim:

1. A molding service station for providing accessories utilized in a casting production, comprising:
    a pedestal base;
    an electric power source;
    at least one vertical panel consisting of a first vertical panel and a second vertical panel having spaced apart opposing sides whereby said panels are separated by a plurality of bands tying said opposing sides of said panels together creating a unit and mounted to said panels an electrical control means for operating said accessories and electric apparatus components which require said electric power source for operation;
    a column for supporting said vertical panel;
    a compressed air source;
    a natural gas power source.

2. A molding service station for providing accessories utilized in said casting production according to claim 1, whereby said electrical control means is mounted on a heat resistant shield fastened to a portion of a front side of said first panel for protection of said electric apparatus components located thereon from any heat source resultant from said casting production.

3. A molding service station for providing accessories utilized in said casting production according to claim 2, whereby said electric apparatus components comprise at least one disconnect to isolate at least one circuit and at least one of said electric apparatus components, at least one circuit breaker for breaking currents under abnormal conditions such as a short circuit, at least one contactor used to control electric power provided by said electric power source, at least one electric outlet, at least one timer and at least one switch for turning on and off said electric power source, all of said electric apparatus components for connection to said electric power source.

4. A molding service station for providing accessories utilized in a casting production, comprising:
    a pedestal base;

a first vertical panel spaced apart from and parallel to a second vertical panel whereby said first vertical panel and said second vertical panel are separated by a plurality of bands tying opposing sides of said first panel to said second panel creating a unit;

a column for supporting said first vertical panel and said second vertical panel;

an electric power source;

a compressed air source;

a natural gas power source.

5. A molding service station for providing accessories utilized in said casting production according to claim 4, having at least one air supply inlet pipe, at least one air supply outlet pipe extending from said inlet pipe leading to a molding machine, at least one outlet pipe extending from said inlet pipe for mold cooling and hand tools, at least one outlet pipe extending from said air supply inlet pipe to a spray gun for applying a coating to a mold.

6. A molding service station for providing accessories utilized in said casting production according to claim 5, whereby a pressure regulator is located on said outlet pipe leading to said spray gun enabling line pressure to be controlled.

7. A molding service station for providing accessories utilized in said casting production according to claim 6, whereby a moisture separator is located on said outlet pipe leading to said molding machine.

8. A molding service station for providing accessories utilized in said casting production according to claim 7, whereby a holding means for containing mold coatings is attached to a portion of a front side of said first panel.

9. A molding service station for providing accessories utilized in said casting production according to claim 8, having at least one air supply inlet pipe for connection to said hand tools.

10. A molding service station for providing accessories utilized in said casting production according to claim 9, wherein said first vertical panel and said second vertical panel are constructed in the form of a lattice grid for acceptance of said holding means to provide increased visibility of said accessories.

11. A molding service station for providing accessories utilized in said casting production according to claim 10, having a second plurality of holding means for holding and organizing said accessories, wherein said second plurality of holding means consist of hook-shaped members which may be easily clipped and unclipped to said lattice grid for locating said hook-shaped members at different points on said lattice grid creating a high degree of efficiency to an operator of said molding service station.

12. A molding service station for providing accessories utilized in said casting production according to claim 11, wherein said hook-shaped members hold at least one spray gun, a plurality of hoses connected to said compressed air source and said natural gas power source and at least one conduit pipe connected to said electric power source.

13. A molding service station for providing accessories utilized in said casting production according to claim 12, having at least one receptacle for containing mold coatings, said receptacle fastened to said lattice grid by a receptacle holding means.

14. A molding service station for providing accessories utilized in a casting production, comprising:

a block configured pedestal base weighted to provide stability to said molding service station;

an electric power source;

at least one vertical panel whereby said vertical panel comprises a first panel and a second panel, whereby said first panel is spaced apart from said second panel in parallel fashion, said first panel and said second panel being separated by a plurality of bands tying said opposing sides of said panels together creating a unit and mounted to said panels an electrical means for operating said accessories and electric apparatus components which require said electric power source for operation;

a column extending from said pedestal base to said vertical panel for support of said vertical panel;

a compressed air source;

a natural gas power source.

* * * * *